United States Patent
Evans et al.

(10) Patent No.: US 8,463,931 B2
(45) Date of Patent: Jun. 11, 2013

(54) PROTECTED DISTRIBUTION AND LOCATION BASED AGGREGATION SERVICE

(75) Inventors: Gregory M. Evans, Raleigh, NC (US);
Hugh Svendsen, Chapel Hill, NC (US);
Olivia Marie Marsh, Raleigh, NC (US)

(73) Assignee: Lerni Technology, LLC, Portsmouth, NH (US)

( * ) Notice: Subject to any disclaimer, the term of this patent is extended or adjusted under 35 U.S.C. 154(b) by 130 days.

(21) Appl. No.: 13/036,676

(22) Filed: Feb. 28, 2011

(65) Prior Publication Data
US 2012/0066488 A1 Mar. 15, 2012

Related U.S. Application Data

(63) Continuation of application No. 12/314,324, filed on Dec. 8, 2008, now Pat. No. 7,921,223.

(51) Int. Cl.
*G06F 15/16* (2006.01)

(52) U.S. Cl.
USPC ........... 709/231; 709/223; 709/225; 709/203; 709/230; 709/232; 709/233; 709/234; 709/235; 709/236; 709/237

(58) Field of Classification Search
USPC .................. 709/231, 223, 225, 203, 230–237
See application file for complete search history.

(56) References Cited

U.S. PATENT DOCUMENTS

| | | | |
|---|---|---|---|
| 3,993,955 A | 11/1976 | Belcher et al. | |
| 4,054,911 A | 10/1977 | Fletcher et al. | |
| 4,058,830 A | 11/1977 | Guinet et al. | |
| 4,099,258 A | 7/1978 | Parsons | |
| 4,155,042 A | 5/1979 | Permut et al. | |
| 4,155,662 A | 5/1979 | Maroth | |
| 4,311,876 A | 1/1982 | Endo et al. | |
| 4,322,854 A | 3/1982 | Bundens et al. | |
| 4,323,921 A | 4/1982 | Guillou | |
| 4,361,848 A | 11/1982 | Poignet et al. | |
| 4,380,821 A | 4/1983 | Eckhardt | |
| 4,420,833 A | 12/1983 | Noirel | |

(Continued)

FOREIGN PATENT DOCUMENTS

| | | |
|---|---|---|
| GB | 2399928 | 9/2004 |
| NE | 8005861 | 5/1982 |

(Continued)

OTHER PUBLICATIONS

"3GPP," Wikipedia, at <http://en.wikipedia.org/wiki/3GPP>, as revised Mar. 27, 2008, printed Dec. 12, 2011, 1 page.

(Continued)

*Primary Examiner* — Jude Jean Gilles

(57) ABSTRACT

A system for and method of per access-point streaming media customization and privacy protected feedback in a wireless network. The system is operative to: encrypt real time streamed media content from a streaming media source; multicast the streamed encrypted media content for availability to a user device for playback, the user device sending out unicast responses at the time of joining or dropping the multicast; aggregate the unicast responses in the form of a connect multicast state or a disconnect multicast state of the user device based on the joining or dropping of the multicast; and provide information back to the streaming media source based on the aggregated unicast responses.

64 Claims, 9 Drawing Sheets

U.S. PATENT DOCUMENTS

| | | |
|---|---|---|
| 4,450,477 A | 5/1984 | Lovett |
| 4,450,481 A | 5/1984 | Dickinson |
| 4,598,385 A | 7/1986 | Kessels et al. |
| 4,600,921 A | 7/1986 | Thomas |
| 4,602,279 A | 7/1986 | Freeman |
| 4,677,686 A | 6/1987 | Hustig et al. |
| 4,680,629 A | 7/1987 | Fukushima et al. |
| 4,686,564 A | 8/1987 | Masuko et al. |
| 4,734,764 A | 3/1988 | Pocock et al. |
| 4,757,371 A | 7/1988 | Nozawa et al. |
| 4,758,959 A | 7/1988 | Thoone et al. |
| 4,783,654 A | 11/1988 | Ichikawa |
| 4,818,987 A | 4/1989 | Ide et al. |
| 4,829,372 A | 5/1989 | McCalley et al. |
| 4,860,379 A | 8/1989 | Schoeneberger et al. |
| 4,862,513 A | 8/1989 | Bragas |
| 4,868,866 A | 9/1989 | Williams, Jr. |
| 4,894,789 A | 1/1990 | Yee |
| 4,903,212 A | 2/1990 | Yokouchi et al. |
| 4,907,159 A | 3/1990 | Mauge et al. |
| 4,951,211 A | 8/1990 | De Villeroche |
| 4,975,693 A | 12/1990 | Davis et al. |
| 4,975,694 A | 12/1990 | McLaughlin et al. |
| 5,020,143 A | 5/1991 | Duckeck et al. |
| 5,036,537 A | 7/1991 | Jeffers et al. |
| 5,065,452 A | 11/1991 | Duckeck et al. |
| 5,070,404 A | 12/1991 | Bullock et al. |
| 5,095,532 A | 3/1992 | Mardus |
| 5,101,510 A | 3/1992 | Duckeck |
| 5,111,400 A | 5/1992 | Yoder |
| 5,121,430 A | 6/1992 | Ganzer et al. |
| 5,126,941 A | 6/1992 | Gurmu et al. |
| 5,155,591 A | 10/1992 | Wachob |
| 5,164,904 A | 11/1992 | Sumner |
| 5,173,691 A | 12/1992 | Sumner |
| 5,181,208 A | 1/1993 | Duckeck |
| 5,182,555 A | 1/1993 | Sumner |
| 5,193,214 A | 3/1993 | Mardus et al. |
| 5,206,641 A | 4/1993 | Grant et al. |
| 5,257,023 A | 10/1993 | Furuya |
| 5,260,778 A | 11/1993 | Kauffman et al. |
| 5,265,024 A | 11/1993 | Crabill et al. |
| 5,274,387 A | 12/1993 | Kakihara et al. |
| 5,276,909 A | 1/1994 | Milner et al. |
| 5,293,163 A | 3/1994 | Kakihara et al. |
| 5,303,401 A | 4/1994 | Duckeck et al. |
| 5,315,295 A | 5/1994 | Fujii |
| 5,317,311 A | 5/1994 | Martell et al. |
| 5,345,606 A | 9/1994 | Duckeck et al. |
| 5,345,607 A | 9/1994 | Liman et al. |
| 5,369,588 A | 11/1994 | Hayami et al. |
| 5,406,490 A | 4/1995 | Braegas |
| 5,432,542 A | 7/1995 | Thibadeau et al. |
| 5,438,687 A | 8/1995 | Suchowerskyj et al. |
| 5,493,692 A | 2/1996 | Theimer et al. |
| 5,565,909 A | 10/1996 | Thibadeau et al. |
| 5,652,841 A | 7/1997 | Nemirovsky et al. |
| 5,752,177 A | 5/1998 | Siegle et al. |
| 5,754,939 A | 5/1998 | Herz et al. |
| 5,784,691 A | 7/1998 | Ruhl |
| 5,796,727 A | 8/1998 | Harrison et al. |
| 5,903,901 A | 5/1999 | Kawakura et al. |
| 5,933,094 A | 8/1999 | Goss et al. |
| 5,949,776 A | 9/1999 | Mahany et al. |
| 5,987,382 A | 11/1999 | Weishaupt et al. |
| 6,014,090 A | 1/2000 | Rosen et al. |
| 6,049,711 A | 4/2000 | Ben-Yehezkel et al. |
| 6,185,427 B1 | 2/2001 | Krasner et al. |
| 6,212,392 B1 | 4/2001 | Fitch et al. |
| 6,240,069 B1 | 5/2001 | Alperovich et al. |
| 6,259,381 B1 | 7/2001 | Small |
| 6,259,405 B1 | 7/2001 | Stewart et al. |
| 6,295,528 B1 | 9/2001 | Marcus et al. |
| 6,326,918 B1 | 12/2001 | Stewart |
| 6,349,203 B1 | 2/2002 | Asaoka et al. |
| 6,438,561 B1 | 8/2002 | Israni et al. |
| 6,456,234 B1 | 9/2002 | Johnson |
| 6,505,046 B1 | 1/2003 | Baker |
| 6,529,136 B2 | 3/2003 | Cao et al. |
| 6,539,232 B2 | 3/2003 | Hendrey et al. |
| 6,542,750 B2 | 4/2003 | Hendrey et al. |
| 6,552,682 B1 | 4/2003 | Fan |
| 6,571,279 B1 | 5/2003 | Herz et al. |
| 6,618,593 B1 | 9/2003 | Drutman et al. |
| 6,647,257 B2 | 11/2003 | Owensby |
| 6,650,902 B1 | 11/2003 | Richton |
| 6,675,015 B1 | 1/2004 | Martini et al. |
| 6,675,268 B1 | 1/2004 | DeKoning et al. |
| 6,853,841 B1 | 2/2005 | St. Pierre |
| 6,876,642 B1 | 4/2005 | Adams et al. |
| 6,882,853 B2 | 4/2005 | Meyers |
| 6,937,860 B2 | 8/2005 | Jahn |
| 6,947,571 B1 | 9/2005 | Rhoads et al. |
| 6,954,443 B2 | 10/2005 | Forstadius et al. |
| 6,970,703 B2 | 11/2005 | Fuchs et al. |
| 6,975,266 B2 | 12/2005 | Abraham et al. |
| 6,985,694 B1 | 1/2006 | De Bonet et al. |
| 6,990,497 B2 | 1/2006 | O'Rourke et al. |
| 7,020,710 B2 | 3/2006 | Weber et al. |
| 7,035,618 B2 | 4/2006 | Schnurr |
| 7,035,912 B2 | 4/2006 | Arteaga |
| 7,047,315 B1 | 5/2006 | Srivastava |
| 7,085,571 B2 | 8/2006 | Kalhan et al. |
| 7,134,040 B2 | 11/2006 | Ayres |
| 7,171,018 B2 | 1/2007 | Rhoads et al. |
| 7,200,638 B2 | 4/2007 | Lake |
| 7,203,753 B2 | 4/2007 | Yeager et al. |
| 7,206,568 B2 | 4/2007 | Sudit |
| 7,218,611 B2 | 5/2007 | Mimura et al. |
| 7,240,106 B2 | 7/2007 | Cochran et al. |
| 7,249,367 B2 | 7/2007 | Bove, Jr. et al. |
| 7,260,638 B2 | 8/2007 | Crosbie |
| 7,269,854 B2 | 9/2007 | Simmons et al. |
| 7,272,357 B2 | 9/2007 | Nishiga et al. |
| 7,319,379 B1 | 1/2008 | Melvin |
| 7,320,069 B1 * | 1/2008 | Sundharraj et al. ........... 713/153 |
| 7,340,768 B2 | 3/2008 | Rosenberger |
| 7,343,160 B2 | 3/2008 | Morton |
| 7,359,894 B1 | 4/2008 | Liebman et al. |
| 7,373,109 B2 | 5/2008 | Pohja et al. |
| 7,395,031 B1 | 7/2008 | Ritter |
| 7,484,103 B2 | 1/2009 | Woo et al. |
| 7,509,131 B2 | 3/2009 | Krumm et al. |
| 7,512,702 B1 | 3/2009 | Srivastava et al. |
| 7,516,212 B2 | 4/2009 | Nguyen et al. |
| 7,620,404 B2 | 11/2009 | Chesnais et al. |
| 7,668,832 B2 | 2/2010 | Yeh et al. |
| 7,684,815 B2 | 3/2010 | Counts et al. |
| 7,920,876 B2 | 4/2011 | Rahman |
| 7,921,223 B2 * | 4/2011 | Evans et al. .................... 709/231 |
| 8,180,911 B2 * | 5/2012 | Banet et al. .................... 709/231 |
| 2001/0039659 A1 | 11/2001 | Simmons et al. |
| 2001/0048449 A1 | 12/2001 | Baker |
| 2002/0019829 A1 | 2/2002 | Shapiro |
| 2002/0044067 A1 | 4/2002 | Ilcisin |
| 2002/0086659 A1 | 7/2002 | Lauper |
| 2002/0086676 A1 | 7/2002 | Hendrey et al. |
| 2002/0171581 A1 | 11/2002 | Sheynblat et al. |
| 2002/0184339 A1 | 12/2002 | Mackintosh et al. |
| 2003/0022675 A1 | 1/2003 | Mergler |
| 2003/0050062 A1 | 3/2003 | Chen et al. |
| 2003/0065721 A1 | 4/2003 | Roskind |
| 2003/0083931 A1 | 5/2003 | Lang |
| 2003/0229549 A1 | 12/2003 | Wolinsky et al. |
| 2004/0117500 A1 | 6/2004 | Lindholm et al. |
| 2004/0148393 A1 | 7/2004 | Breiter et al. |
| 2004/0160307 A1 | 8/2004 | Saikkonen et al. |
| 2004/0225519 A1 | 11/2004 | Martin |
| 2004/0254886 A1 | 12/2004 | Siepen et al. |
| 2005/0015800 A1 | 1/2005 | Holcomb |
| 2005/0021369 A1 | 1/2005 | Cohen et al. |
| 2005/0033780 A1 | 2/2005 | Simelius et al. |
| 2005/0038876 A1 | 2/2005 | Chaudhuri |
| 2005/0059379 A1 | 3/2005 | Sovio et al. |
| 2005/0060350 A1 | 3/2005 | Baum et al. |
| 2005/0071221 A1 | 3/2005 | Selby |
| 2005/0160270 A1 | 7/2005 | Goldberg et al. |

| | | |
|---|---|---|
| 2005/0174975 A1 | 8/2005 | Mgrdechian et al. |
| 2005/0197846 A1 | 9/2005 | Pezaris et al. |
| 2005/0198097 A1 | 9/2005 | Kalnitsky |
| 2005/0245233 A1 | 11/2005 | Anderson |
| 2005/0251453 A1 | 11/2005 | Lu |
| 2005/0251565 A1 | 11/2005 | Weel |
| 2005/0251566 A1 | 11/2005 | Weel |
| 2005/0251576 A1 | 11/2005 | Weel |
| 2005/0251807 A1 | 11/2005 | Weel |
| 2005/0261001 A1 | 11/2005 | Marley et al. |
| 2005/0272413 A1 | 12/2005 | Bourne |
| 2005/0280557 A1 | 12/2005 | Jha et al. |
| 2006/0059142 A1 | 3/2006 | Zvinyatskovsky et al. |
| 2006/0085419 A1 | 4/2006 | Rosen |
| 2006/0085821 A9 | 4/2006 | Simmons et al. |
| 2006/0099963 A1 | 5/2006 | Stephens |
| 2006/0123080 A1 | 6/2006 | Baudino et al. |
| 2006/0149628 A1 | 7/2006 | Chefalas et al. |
| 2006/0149631 A1 | 7/2006 | Brazell et al. |
| 2006/0167985 A1 | 7/2006 | Albanese et al. |
| 2006/0168264 A1 | 7/2006 | Baba et al. |
| 2006/0218225 A1 | 9/2006 | Hee Voon et al. |
| 2006/0223518 A1 | 10/2006 | Haney |
| 2006/0229939 A1 | 10/2006 | Bhakta et al. |
| 2006/0269058 A1 | 11/2006 | Kessler et al. |
| 2006/0271281 A1 | 11/2006 | Ahn et al. |
| 2006/0287915 A1 | 12/2006 | Boulet et al. |
| 2007/0077942 A1 | 4/2007 | Heaven et al. |
| 2007/0121843 A1 | 5/2007 | Atazky et al. |
| 2007/0136132 A1 | 6/2007 | Weiser et al. |
| 2007/0147411 A1 | 6/2007 | Bijwaard et al. |
| 2007/0168254 A1 | 7/2007 | Steelberg et al. |
| 2007/0174243 A1 | 7/2007 | Fritz |
| 2007/0205276 A1 | 9/2007 | Sodan et al. |
| 2007/0218867 A1 | 9/2007 | Mononen et al. |
| 2007/0249327 A1 | 10/2007 | Nurmi |
| 2007/0260508 A1 | 11/2007 | Barry et al. |
| 2007/0271136 A1 | 11/2007 | Strauss et al. |
| 2007/0281689 A1 | 12/2007 | Altman et al. |
| 2008/0016205 A1 | 1/2008 | Svendsen |
| 2008/0033809 A1 | 2/2008 | Black et al. |
| 2008/0081638 A1 | 4/2008 | Boland et al. |
| 2008/0097999 A1 | 4/2008 | Horan |
| 2008/0133484 A1 | 6/2008 | Yamamoto |
| 2008/0148175 A1 | 6/2008 | Naaman et al. |
| 2008/0182591 A1 | 7/2008 | Krikorian |
| 2008/0208652 A1 | 8/2008 | Srivastava |
| 2008/0250337 A1 | 10/2008 | Lemmela et al. |
| 2008/0268822 A1 | 10/2008 | Johnson et al. |
| 2008/0288375 A1 | 11/2008 | Uhrig et al. |
| 2008/0307108 A1 | 12/2008 | Yan et al. |
| 2008/0312946 A1 | 12/2008 | Valentine et al. |
| 2009/0030999 A1 | 1/2009 | Gatzke et al. |
| 2009/0055229 A1 | 2/2009 | Lidgren et al. |
| 2009/0085724 A1 | 4/2009 | Naressi et al. |
| 2009/0315670 A1 | 12/2009 | Naressi et al. |
| 2010/0015991 A1 | 1/2010 | Evans et al. |
| 2010/0041419 A1 | 2/2010 | Svendsen et al. |
| 2010/0146135 A1 | 6/2010 | Evans et al. |
| 2012/0066488 A1* | 3/2012 | Evans et al. ............ 713/150 |

FOREIGN PATENT DOCUMENTS

| | | |
|---|---|---|
| WO | WO 90/05969 | 5/1990 |
| WO | WO 90/13882 | 11/1990 |
| WO | WO 91/07029 | 5/1991 |
| WO | WO 91/14154 | 9/1991 |
| WO | WO 99/05877 | 2/1999 |
| WO | WO 00/03830 | 1/2000 |
| WO | WO 01/24551 | 4/2001 |
| WO | WO 02/29506 | 4/2002 |
| WO | WO 02/062092 | 8/2002 |
| WO | WO 2006/082566 | 8/2006 |

OTHER PUBLICATIONS

"4G," Wikipedia, at <//en.wikipedia.org/wiki/4G>, as revised Apr. 23, 2008, printed Dec. 12, 2011, 1 page.

Cowling, James, "Dynamic Location Management in Heterogeneous Cellular Networks," Thesis under Dr. Bjorn Landfeldt, Advanced Networks Research Group, School of Information Technologies, University of Sydney, Sydney, Australia, Oct. 2004, 155 pages.

"Digital rights management," at <http://en.wikipedia.org/wiki/Digital_rights_management>, includes information dating back to 1998, page last modified Apr. 16, 2011, printed Apr. 21, 2011, 21 pages.

Dutta, et al., "MarconiNet supporting Streaming Media over Localized Wireless Multicast," International Workshop of Mobile E-Commerce, Sep. 28, 2002, Atlanta, Georgia, 9 pages.

"IPv6," Wikipedia, at <http://en.wikipedia.org/wiki/IPv6>, includes information that dates back to the early 1980s, page last modified Apr. 18, 2011, printed Apr. 21, 2011, 16 pages.

Kumar, Vijay, "Mobile Computing—Cellular Technology," Computer Science Department, University of Missouri—Kansas City, Kansas City, Missouri, date unknown youngest reference is dated 2001, found at <http://k.web.umkc.edu/kumarv/cs572/cellular-technology.pdf>, 8 pages.

"Multicast," Wikipedia, at <http://en.wikipedia.org/wiki/Multicast>, includes information that dates back to 2005, page last modified Mar. 26, 2011, printed Apr. 21, 2011, 5 pages.

Scrase, Adrian, "Overview of the Current Status of 3GPP LTE," Presentation Slides, ETSI, World Class Standards, Mobile World Congress, Feb. 11-14, 2008, Barcelona, Spain, 20 pages.

Tsuzawa, M. et al.,"Advanced Mobile Traffic Information and Communication System â∈AMTICS," Vehicle Navigation and Information Systems Conference, 1989, Conference Record, Sep. 11-13, 1989, Toronto, Ontario, Canada, pp. 475-483, published by IEEE, 10 pages.

"Anthem—Overview," at <http://www.intercastingcorp.com/platform/anthem>, copyright 2004-2007, Intercasting Corp., printed Jan. 16, 2008, 2 pages.

"Apple—iPod classic," at <http://www.apple.com/ipodclassic/>, printed Oct. 26, 2007, 1 page.

Thoone, Martin L. G. et al., "Application of the Compact Disc in Car Information and Navigation Systems," SAE Technical Paper Series, International Congress & Exposition, Feb. 1, 1984, pp. 105-111, published by SAE International, 8 pages.

Gordon, Robert L., "Architectures for In-Vehicle Navigation Systems Displaying Real Time Traffic Condition Information," Vehicle Navigation & Information Systems Conference, Sep. 11-13, 1989, Toronto, Ontario, Canada, pp. 119-124, published by IEEE, 7 pages.

"Bluetooth.com—Learn," http://www.bluetooth.com/Bluetooth/Learn/, copyright 2007 Bluetooth SIG, Inc., printed Oct. 26, 2007, 1 page.

Challe, Philippe, "Carminat," An Integrated Information and Guidance System, Vehicle Navigation & Information Systems Conference Proceedings, Oct. 20-23, 1991, pp. 137-145, published by IEEE, 11 pages.

"CEN/TC 278 Project Team 12 M-270 Phase 1: Standards for Road Transport and Traffic Telematics: Annexes," May 1999, published by Information & Communications Technologies (ICT) Standards Board, Intelligent Transport Systems Steering Group (ITSSG), printed Oct. 9, 2003, 48 pages.

Weld, Robert B., "Communications Flow Considerations in Vehicle Navigation and Information Systems," Vehicle Navigation and Information Systems Conference, Sep. 11-13, 1989, Toronto, Ontario, Canada, Conference Record, pp. 373-375, published by IEEE, 4 pages.

"Dating Service—Singles, Personals and Love, Match.com," http://www.match.com/, copyright 2008 Match.com, printed Jan. 16, 2008, 2 pages.

Markowetz, A. et al., "Design and Implementation of a Geographic Search Engine," Eighth International Workshop on the Web and Databases (WebDB 2005), Jun. 16-17, 2005, Baltimore, Maryland, at <http://cis.poly.edu/suel/papers/geo.pdf>, 6 pages.

Shibano, Yoshizo et al., "Development of Mobile Communication System for RACS," Vehicle Navigation and Information Systems Conference, Sep. 11-13, 1989, Toronto, Ontario, Canada, Conference Record, pp. 376-383, published by IEEE, 9 pages.

"dodgeball.com :: mobile social software," at <http://www.dodgeball.com/>, copyright 2008, Google Inc., printed Jan. 16, 2008, 1 page.

"eHarmony," http://eharmony.com/, copyright 2000-2008 eHarmony.com, printed Jan. 16, 2008, 1 page.

"flickr," http://www.flickr.com/, copyright 2008 Yahoo! Inc., printed Jan. 16, 2008, 1 page.

"Friendster—Home," http://www.friendster.com/, copyright 2002-2007 Friendster, Inc., printed Jan. 16, 2008, 1 page.

"Google AdWords: Regional and Local Targeting," https://adwords.google.com/select/targeting.html, copyright 2008 Google, printed Jul. 17, 2008, 1 page.

"Google Talk," http://www.google.com/talk/, copyright 2008 Google, printed Jan. 16, 2008, 1 page.

"iChat. Not being there is half the fun," http://www.apple.com/macosx/features/ichat.html, printed Jan. 16, 2008, 1 page.

"icq," http://www.icq.com/, copyright 1998-2008 ICQ Inc., printed Jan. 16, 2008, 2 pages.

"IEEE 802.11—Wlkipedia, the free encyclopedia," http://en.wikipedia.org/wiki/IEEE_802.11, printed Oct. 26, 2007, 5 pages.

Fukui, Ryotaro et al., "Individual Communication Function of RACS: Road Automobile Communication System," Vehicle Navigation and Information Systems Conference, Sep. 11-13, 1989, Toronto, Ontario, Canada, pp. 206-213, published by IEEE, 9 pages.

Frank, Daniel L., "Information Systems: An Integral Part of Future Vehicles,"Proceedings of the Position Location and Navigation Symposium (PLANS '90), Mar. 20-23, 1990, Las Vegas, Nevada, pp. 52-55, published by IEEE, 5 pages.

"Instant Messenger—AIM—Instant Message Your Online Buddies for Free—AIM," http://dashboard.aim.com/aim, copyright 2007 AOL LLC, printed Nov. 8, 2007, 6 pages.

"Internet Relay Chat—Wikipedia, the free encyclopedia," http://en.Wikipedia.org/wiki/IRC, printed Nov. 16, 2007, 11 pages.

"Jabber SoftwareFoundation," http://www.jabber.org/, copyright 1999-2005 the Jabber Software Foundation, printed Jan. 16, 2008, 3 pages.

"mobile community, free sms, mobile dating, text flirting and friends networking—playtxt . . . ," http://web.archive.org/web/20070225125113rn_1/www.playtxt.net/playtxt.do, printed Jan. 16, 2008, 1 page.

"MySpace," at <http://www.myspace.com/>, copyright 2003-2008, MySpace.com, printed Jan. 16, 2008, 2 pages.

Ikeda, M. et al., "New Navigation System, MAPIX-III," Proceedings of the 16th ISATA, 16th International Symposium on Automotive Technology & Automation with particular reference to automotive micro-electronics vehicle management systems and computer-aided testing, May 11-15, 1987, Florence, Italy, pp. 63-80, published by Automotive Automation, Ltd., Croydon, England, 19 pages.

"Online adult dating service and personals—Lavalife—Where Singles Click," at <http://lavalife.com/>, copyright 2006, Lavalife Corp., printed Jan. 16, 2008, 1 page.

Farradyne Systems, Inc., "Pathfinder Final Report—Draft—vol. I—Pathfinder System, prepared for: Federal Highway Administration," May 1, 1991, 51 pages.

Mammano, Frank J. et al., "Pathfinder Status and Implementation Experience," Vehicle Navigation and Information Systems Conference, 1991, Oct. 20-23, 1991, pp. 407-413, published by IEEE, 9 pages.

Mammano, F. et al., "Pathfinder System Design,"Vehicle Navigation and Information Systems Conference, 1989, Conference Record, Sep. 11-13, 1989, Toronto, Ontario, Canada, pp. 484-488, published by IEEE, 6 pages.

"Rabble—Social networking for your phone," http://www.rabble.com/, copyright 2005-2008 Intercasting Corp., printed Jan. 16, 2008, 1 page.

Ely, S. R., "RDS-ALERT: A Drive project to develop a proposed standard for the Traffic Message Channel feature of the Radio Data System RDS," IEE Colloquium on Car and its Environment: What Drive and Prometheus Have to Offer, Jan. 25, 1990, London, United Kingdom, pp. 8/1-8/6, published by IEEE, 7 pages.

"Service Guide for Mobile Broadcast Services," Candidate Version 1.0, Feb. 26, 2008, Open Mobile Alliance, copyright 2008, Open Mobile Alliance Ltd., found at <http://www.openmobilealliance.org/Technical/release_program/docs/BCAST/V1_0-20080226-C/OMA-TS-BCAST_Service_Guide-V1_0-20080226-C.pdf>, printed Apr. 18, 2011, pp. 1-217.

"SmallPlanet: Home," http://web.archive.org/web/20061105030323/http://www.smallplanet.net/, copyright 2005 SmallPlanet.net, printed Jan. 16, 2008, 1 page.

Davies, Peter et al., "Standards for the Radio Data System, Traffic Message Channel," Future Transportation Technology Conference and Exposition, Aug. 7-10, 1989, Vancouver, British Columbia, Canada, pp. 105-115, published in the SAE Technical Paper Series, copyright 1989, Society of Automotive Engineers, Inc., 16 pages.

"Technology—Geo Targeting," http://www.invidi.com/pages/itc_technology_05.html, copyright 2007, printed Nov. 18, 2008, 1 page.

Krage, Mark K., "The TravTek Driver Information System," Vehicle Navigation and Information Systems Conference, Oct. 20-23, 1991, pp. 739-748, published by IEEE, 12 pages.

Rillings, James H. et al., "TravTek," Vehicle Navigation and Information Systems Conference, Oct. 1991, Warrandale, Pennsylvania, published Oct. 1, 1991, pp. 729-737, published by Society of Automotive Engineers, Inc., Warrendale, Pennsylvania, 10 pages.

Blumentritt, C. W. et al., "TravTek system architecture evaluation," Jul. 1995, published by Federal Highway Administration, Springfield, VA: available through the National Technical Information Service, 1995, 251 pages.

"Windows Live Messenger—Overview," http://get.live.com/messenger/overview, copyright 2007 Microsoft Corp., printed Nov. 28, 2007, 1 page.

"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

"Yahoo! Personals," http://personals.yahoo.com/us/homepage/splash, copyright 2008 Yahoo! Inc., printed Jan. 16, 2008, 2 pages.

"Zune," http://www.zune.net/en-US/, copyright 2008 Microsoft Corporation, printed Jan. 16, 2008, 1 page.

\* cited by examiner

PROTECTED DISTRIBUTION AND LOCATION BASED AGGREGATION SERVICE

RELATED APPLICATIONS

This patent application is a continuation of U.S. patent application Ser. No. 12/314,324, filed Dec. 8, 2008, entitled "PROTECTED DISTRIBUTION AND LOCATION BASED AGGREGATION SERVICE," the disclosure of which is hereby incorporated herein by reference in its entirety.

FIELD OF THE INVENTION

The present application relates to a system for and method of per access-point streaming media customization and privacy protected feedback in wireless networks such as bandwidth constrained wide area network (WAN) connected IPv6 mobile networks.

BACKGROUND OF THE INVENTION

Even with the popularity of MP3 players and smart mobile phones, such as iPhones®, for portable content storage and playback, terrestrial radio broadcasts continue to generate more than $20 billion annually in advertisement (ad) revenue. However, approximately 75% of this revenue is generated from localized ad insertion. As large radio station conglomerates transition from traditional terrestrial broadcasting to a primary focus on internet delivery, they will inevitably need to develop new business models to address local vendor ad opportunities.

In view of the foregoing, leveraging long-term-evolution (LTE) and global positioning system (GPS) mobile features without compromising listener privacy for streaming media will be a desire of internet radio and wireless carrier providers.

In addition to the radical changes of traditional (ad based) radio distribution as owners shift to primarily internet distribution, a concurrent secondary paradigm shift will occur within wireless data distribution and their associated backhaul networks. Basically, as fiber is built out to the towers to handle LTE and Wi-Max, the bandwidth choke points will move from backhaul to available wireless spectrum. Accordingly, US wireless carriers will necessarily require more efficient systems to allow internet radio distribution over their mobile LTE and Wi-Max networks.

SUMMARY OF THE INVENTION

According to one aspect, the present invention provides a system and method that regulate access to multicast streamed content from bandwidth constrained IPv6 access points.

According to another aspect, the present invention provides a system for per access-point streaming media customization and privacy protected feedback in a wireless network, comprising: means for encrypting real time streamed media content from a streaming media source; means for multicasting the streamed encrypted media content for availability to a user device for playback, the user device sending out unicast responses at the time of joining or dropping the multicast; means for aggregating the unicast responses in the form of a connect multicast state or a disconnect multicast state of the user device based on the joining or dropping of the multicast; and means for providing information back to the streaming media source based on the aggregated unicast responses.

The streaming media source may be an internet radio, and the user device may comprise a mobile device, such as a smart phone or a portable media device.

The wireless network may comprise a bandwidth constrained wide area network (WAN) connected IPv6 mobile network.

The unicast response from the mobile device may further include at least one of a unique mobile device identification (ID) or a location coordinate of the mobile device.

The unicast response from the mobile device may further include a unique mobile device identification (ID), a location coordinate of the mobile device, a streaming media source ID request, and a timestamp.

The location coordinate may be determined via a global positioning system (GPS).

The streamed encrypted media content may be encrypted with a digital rights management (DRM) key.

The information provided back to the internet radio as the streaming media source may include at least one of a radio tower identification (ID), a timestamp, a channel selected, a channel de-selected or a channel global positioning position (GPS).

The invention further provides a method of per access-point streaming media customization and privacy protected feedback in a wireless network, the method comprising: encrypting real time streamed media content from a streaming media source; multicasting the streamed encrypted media content for availability to a user device for playback, the user device sending out unicast responses at the time of joining or dropping the multicast; aggregating the unicast responses in the form of a connect multicast state or a disconnect multicast state of the user device based on the joining or dropping of the multicast; and providing information back to the streaming media source based on the aggregated unicast responses.

The present invention also contemplates a computer readable medium comprising a program for instructing the system to perform the above-described operations.

According to a still further aspect, the present invention provides a mobile wireless access device, comprising: a network interface communicatively coupling the mobile wireless access device to a network server; a controller associated with the network interface and operative to: transmit location coordinate information, an access-point identification (ID), and a streaming media ID request to the network server; receive an encrypted streamed media multicast from the network server; receive a multicast unique key for streamed content decryption; decrypt the streamed content for playback by a player function; transmit a successful connection and decryption of the streamed media multicast back to the network server; and transmit a termination of the connection of the streamed media multicast back to the network server.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
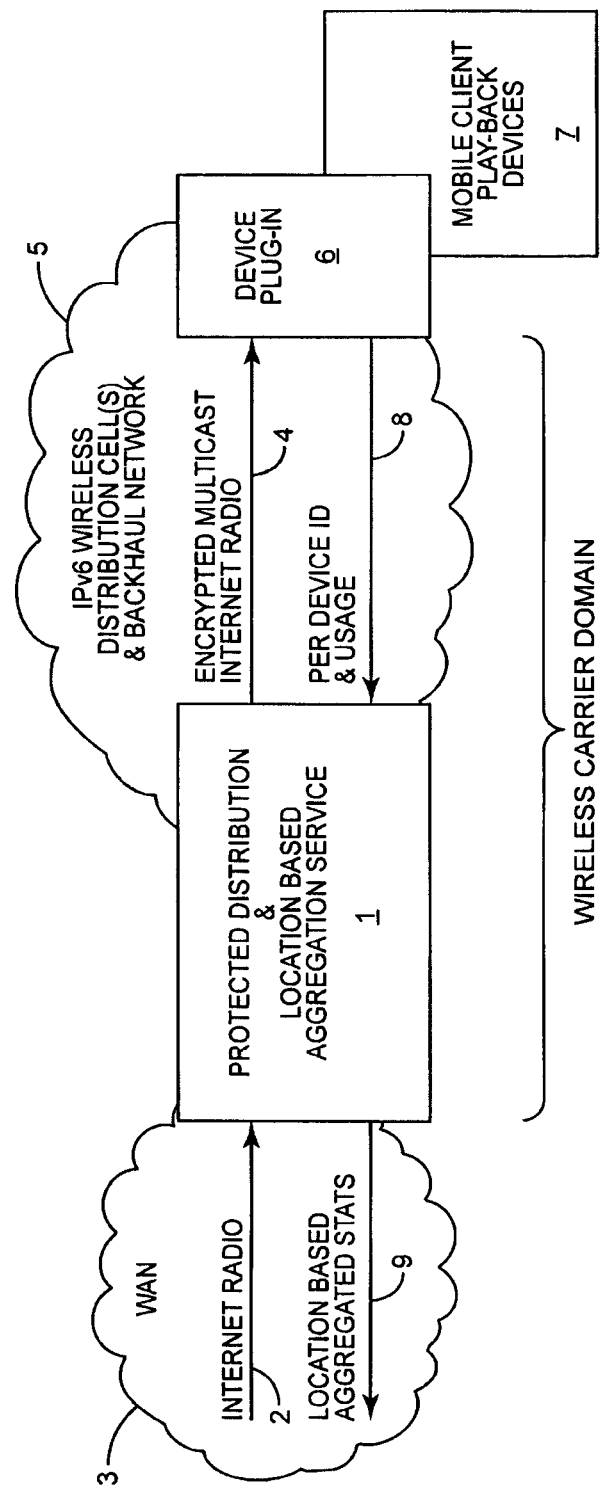
FIG. 1 illustrates a top level system diagram according to an exemplary embodiment of the present invention.

FIG. 1 is a top level system diagram showing the central service and client plug-in functions according to an exemplary embodiment of the present invention. These functions would typically be provided by or under the control of a wireless network owner. More specifically, the system shown in FIG. 1 is designed to regulate access to multicast streamed content from bandwidth constrained IPv6 access points. For the sake of clarity, internet radio distribution over a long-term-evolution (LTE) carrier-based wireless network will be described as an exemplary embodiment.

As shown in FIG. 1, a protected distribution and location based aggregation service 1, in the form of a central server, receives Internet radio feeds as shown by communication input 2 from the WAN 3 and encrypts prior to distributing as at 4 within the wireless carrier's network such as IPv6 wireless distribution cell(s) and backhaul network 5. A device plug-in 6 provided to users' mobile client playback devices 7 provides a decryption function. The plug-in device 6 also provides usage data feedback as shown by communication input 8 to the protected distribution and location based aggregation service 1. The service 1 summarizes the usage data and makes location based aggregated statistics available as shown by communication output 9 back to the internet radio stations or other third parties.

Figure 2:
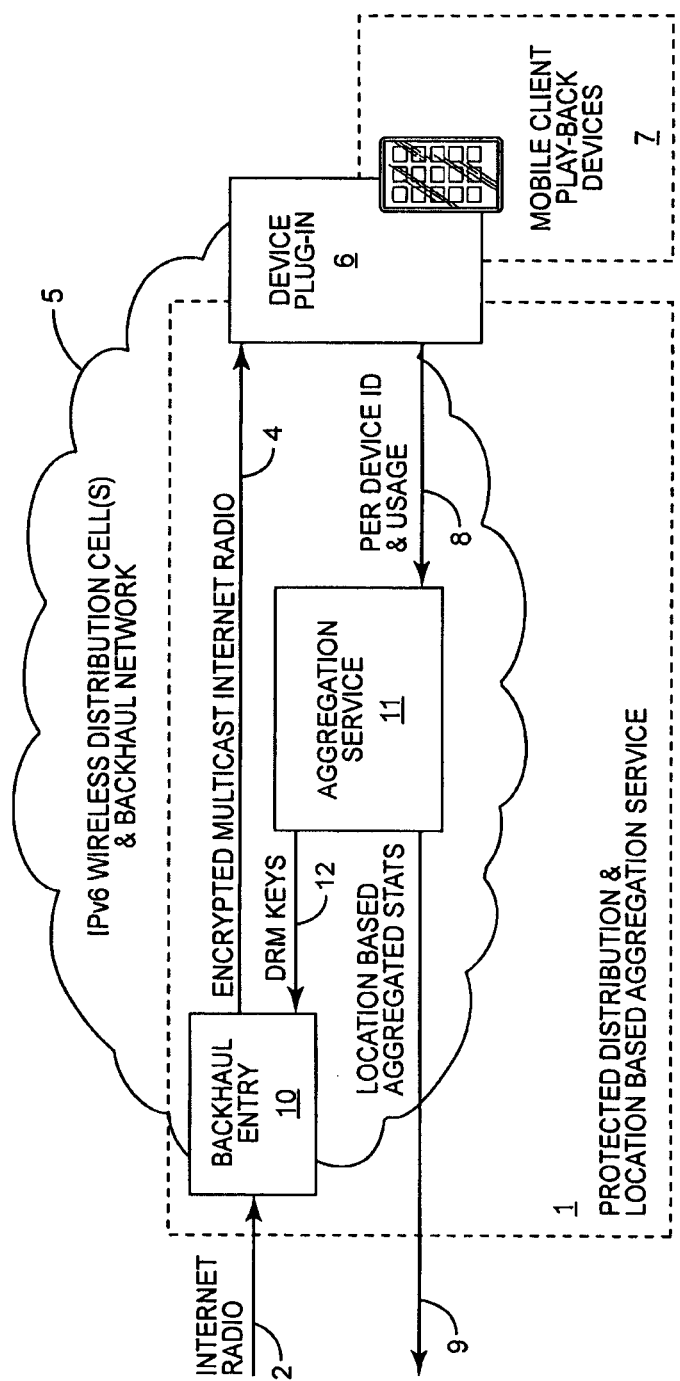
FIG. 2 is a system diagram illustrating further details of a protected distribution and location-based aggregation service according to an exemplary embodiment of the present invention.

FIG. 2 is a system diagram illustrating further details of the protected distribution and location based aggregation service 1 according to an exemplary embodiment of the present invention. In particular, as shown in FIG. 2, the central server of the service 1 includes a separate backhaul entry 10 and an aggregation service 11. The backhaul entry 10 is responsible for the encryption of each Internet radio 2. The separation allows the function to be located at the source of the Internet radio station or at the most cost-effective point in the carrier network. Each backhaul entry point 10 receives DRM keys as shown by communication input 12 from the aggregation service 11 for encryption of each internet radio 2.

Figure 3:
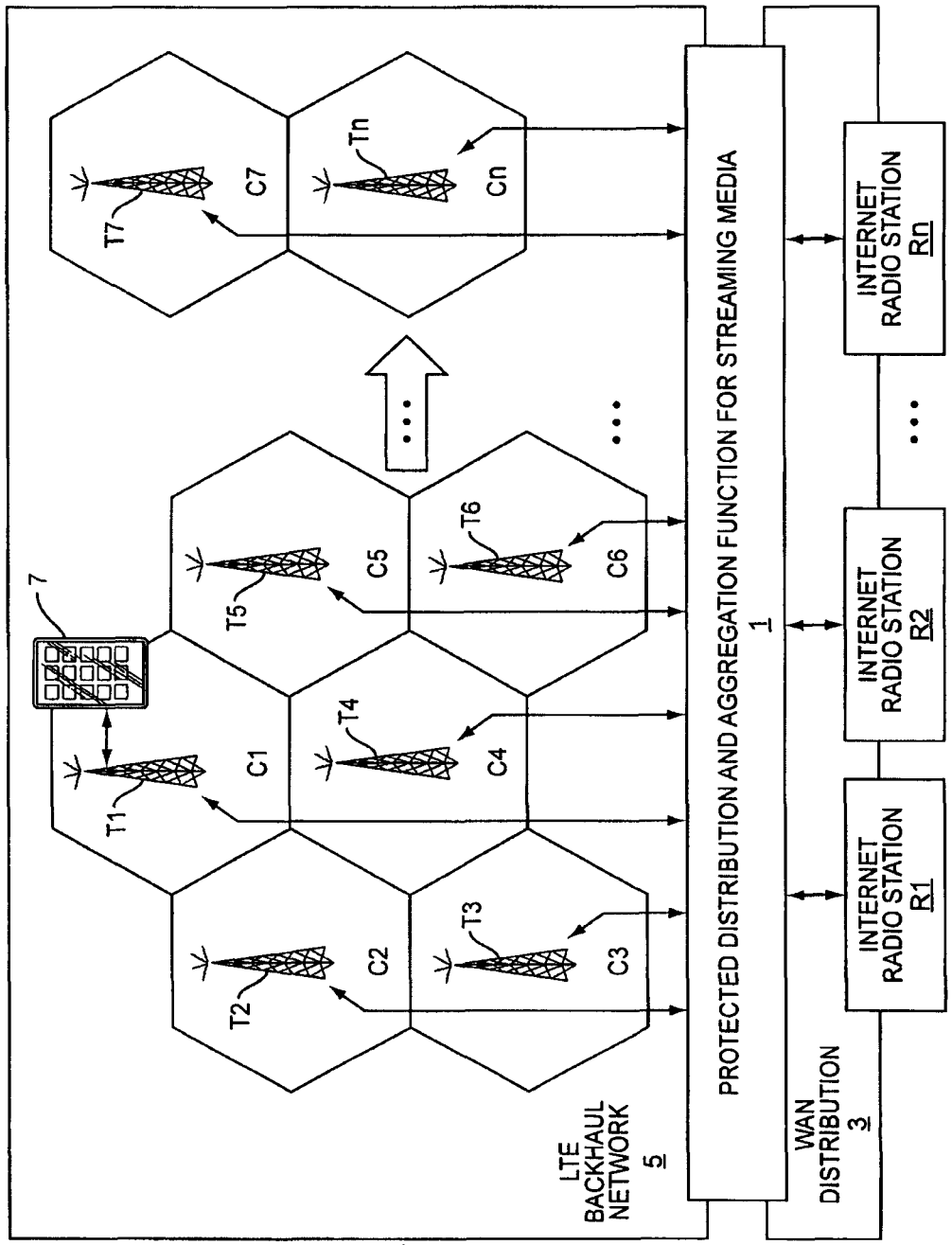
FIG. 3 illustrates a system scaling base on tower and internet radio station according to an exemplary embodiment of the present invention.

A service 1 consistent with the present invention is well suited to support many internet radio stations R1, R2, ... Rn across many carrier access points as shown in FIG. 3. Using the example of LTE, a system consistent with the present invention will support a large group of wireless cells C1, C2, C3, C4, C5, C6, C7, ... Cn (or carrier access points) for mobile devices 7. At cell sizes of 5 kilometers, LTE can support spectrum slices as narrow as 1.25 MHz or as wide as 20 MHz. With 4×4 multiple input, multiple output (MIMO) antenna technology, LTE can achieve more than 300 megabits per second (Mbps) total across 200 mobile devices 7. At 128 kilobits per second (Kbps) per internet radio channel, reserving some amount of LTE spectrum per tower/cell for multicast distribution would be a logical plan for carriers. In this scenario, leveraging the two way capabilities of LTE to collect real-time aggregated listener statistics could be of high economic value to radio station owners. True royalty calculation could be performed on a per song per play basis to obtain accurate reporting back to content owners. Additionally, collected location based statistics for listeners could allow better target advertising for ad slots. Again, ads could be late-binded on a per tower T1, T2, T3, T4, T5, T6, T7, ... Tn basis using, for example, vendor defined rule sets on geographic locations as described in copending U.S. application Ser. No. 12/189,861, filed Aug. 12, 2008 entitled "Method for Location Based Advertising Based on Binding Bids to User Defined Arbitrary Shapes", the contents of which are incorporated herein by reference.

Scaling of this system could be on a regional basis or the carrier could backhaul their entire network for this function to a single data or network operations center (NOC). With carrier plans to implement fiber based backhauls, this may be the most cost effective solution. However, reliability (or downtime) risks per number of listeners would be much higher. Multiple deployments on a regional scenario may be easier to manage from a business and technical implementation when supporting local vendors and local radio stations.

Figure 4:
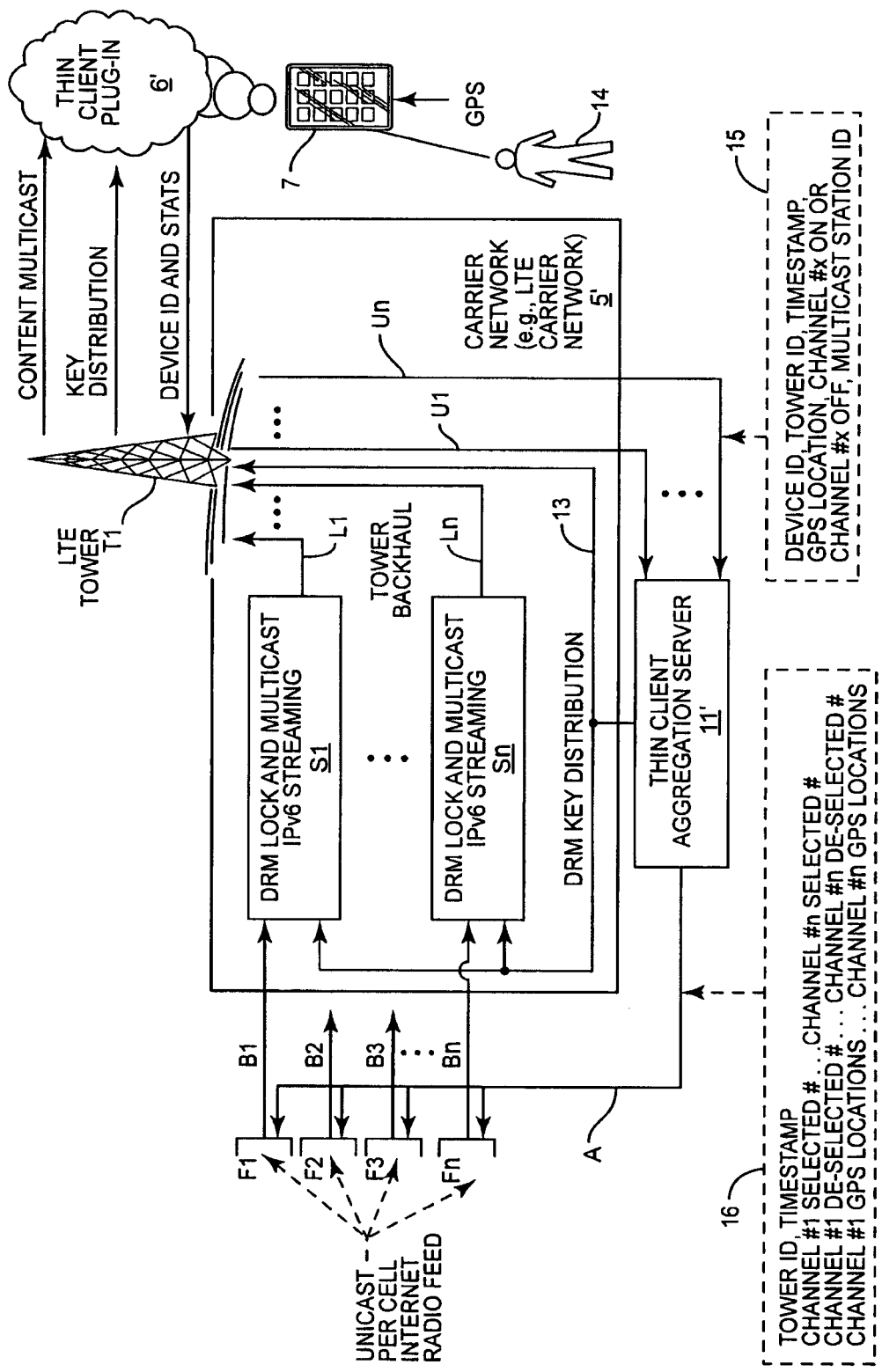
FIG. 4 is a more detailed diagram illustrating additional details for serving a single access point or tower as shown in connection with FIG. 3.

FIG. 4 is a more detailed diagram illustrating additional details for serving a single access point or tower (e.g., T1) as shown in connection with FIG. 3. A backhaul entry point B1, B2, B3, ... Bn is provided for each radio station feed F1, F2, F3, ... Fn targeted for a given tower. As discussed earlier, the entry point may be within the carrier's network or located at the radio station source (or any point in-between). At this entry point B1, ... Bn, the streamed content is encrypted with a DRM key as shown by DRM key distribution 13 provided by the thin client aggregation server 11'. Keys may also be generated locally at the entry point, but this approach may require more management overhead in large networks. The encrypted internet radio content with the key is DRM locked and multicast IPv6 streamed as shown at S1, ... Sn and output as shown by L1, ... Ln to the given tower such as T1 for multicast availability by mobile playback devices 7. The encryption re-streaming function happens in real-time with minimal buffering that would add delay to the Internet radio station R1, ... Rn broadcast.

As a client such as a user 14 having a mobile client playback device 7, such as but not limited to a smart phone including an iPhone®, joins the multicast, the key is used by a thin client plug-in 6' to decrypt the signal (note that the term "thin client" as used herein simply refers to the fact that either a program or hardware device relies on having most or all of its functionality supplied by a network server). At the time of joining or dropping a multicast, the thin client plug-in 6' sends a unicast response U1, ... Un to the thin client aggregation server 11'. Information for the unicast response U1, ... Un includes (but is not limited to) the following (see the broken line box labeled 15 in FIG. 4):

Unique mobile device identification (ID) (embedded serial number, media access control (MAC) address, etc.);
Multicast station ID (unique to radio station);
Tower ID (if common multi-cast address used between towers);
Timestamp;
Location of device via GPS (or other location identifying system); and
State of "turning on" or "turning off" given multicast.

For further security, the client may require the unicast response U1, ... Un to be acknowledged by the thin client aggregation server 11'. This would keep the device from being hacked to intercept or block the responses to the thin client aggregation server 11'. Transmission control protocol (TCP) (layer-4) would satisfy this requirement.

The architecture of the thin client plug-in 6' (i.e., executable) is protected such that the client cannot be (easily) modified. Even though the key is public, the actual encryption and decryption algorithms are kept proprietary. Alternately, the digital rights management (DRM) key may be encrypted. The internals of the plug-in 6' would know how to decrypt the key. For a given carrier, a single type of plug-in with a single hidden key could be used. One skilled in the art would recognize many methods to use DRM to protect multicast transmission over the wireless network.

Finally, the unicast responses U1, ... Un are aggregated at the thin client aggregation server 11' and provided in one or more formats back to the radio station or other third parties as shown by feedback A. As shown by the broken line box labeled 16 in FIG. 4, the information fed back to the radio station includes, but is not limited to, tower ID, timestamp, channel selected, channel de-selected and channel GPS locations. However, individual device Ds remain private to the carrier's network (i.e., the thin client aggregation server 11' must remain with the premises and control of the carrier or provider).

Figure 5:
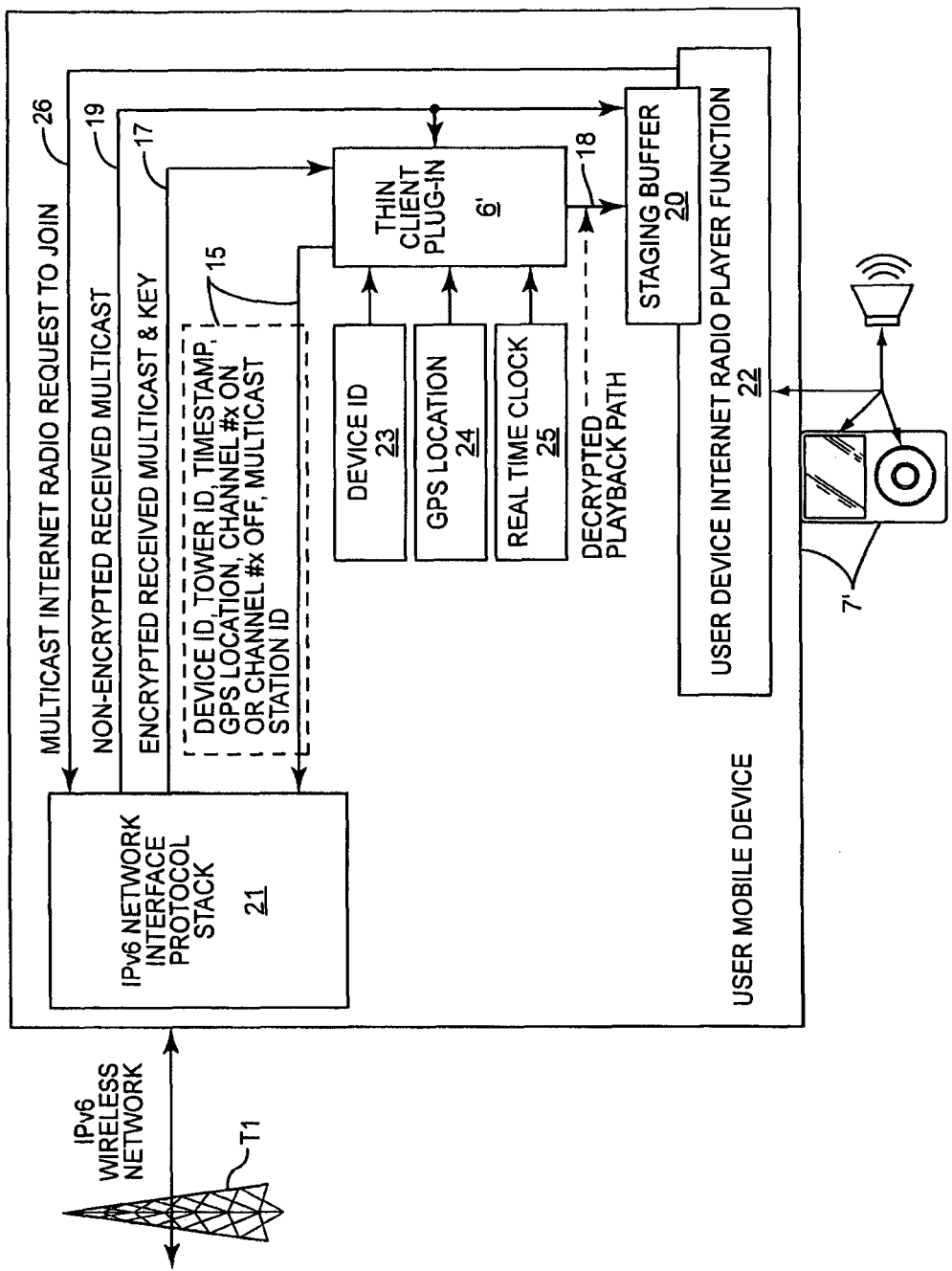
FIG. 5 illustrates a block diagram showing the basic operation of a thin client plug-in according to an exemplary embodiment of the present invention.

FIG. 5 illustrates a block diagram showing the basic operation of a thin client plug-in function according to an exemplary embodiment of the present invention. The actual implementation may be hardware, software, or firmware; or some combination thereof. The thin client functionally resides between the network interface, as shown at IPv6 network interface protocol stack 21 which communicates with the network server, and the playback function as shown at user device internet radio player function 22 of the user mobile device 7' (in this case shown as a portable media device such as an iPod®). A staging buffer 20 or other memory function may be required allowing smooth transitions between tower T1 handoffs of the streamed content. The thin client plug-in 6' serves as a controller primarily responsible for identifying the encrypted multicast shown as encrypted received multicast and key 17, obtaining the key from the multicast, and decrypting the signal before supplying the signal through decrypted playback path 18 to the staging buffer 20. To accomplish this, the thin client plug-in 6' may be required to monitor all received multicasts 19. The thin client plug-in 6' also has access to the device ID function 23, GPS location function 24, and real time clock function 25 resident to the device. This information is used as previously described for tagging of responses when joining (see reference line 26) or disconnecting from a multicast.

Figure 6:
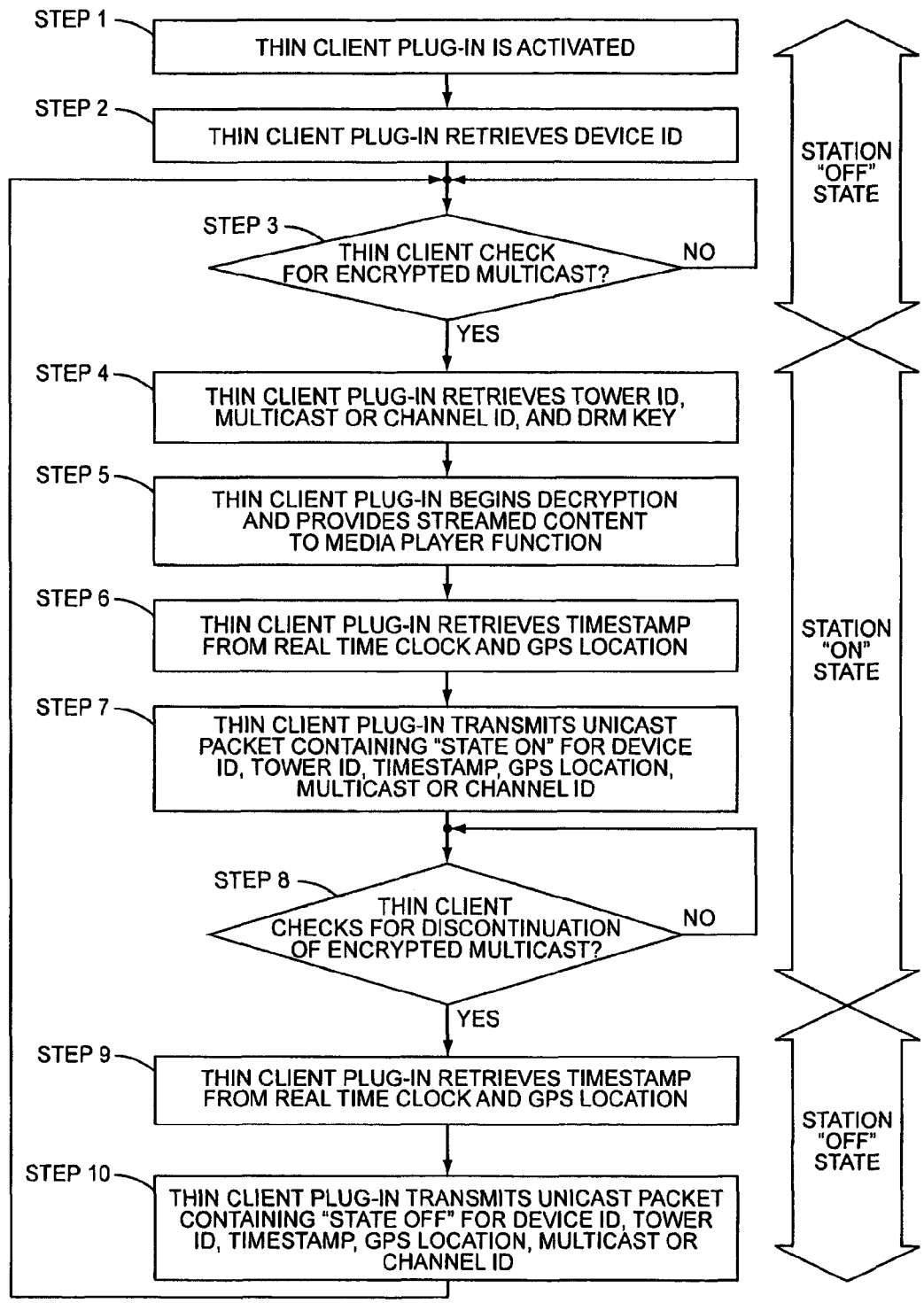
FIG. 6 is an operation flowchart illustrating a client plug-in according to an exemplary embodiment of the present invention.

FIG. 6 is a flowchart showing the basic operation of the thin client plug-in 6'. The thin client plug-in 6' operates between two basic modes or states, either a station "on" state or a station "off" state. In the station "on" state, the user mobile device 7' is connected to a streamed multicast session from a given access point. Steps 4 through 8 are in a station "on" state operation. Steps 1 through 3, 9 and 10 are station "off" states. Each time a state transfers from one to the other (step 3 to "on"; or step 8 to "off"), the thin client plug-in 6' identifies to the central service or centralized controller such as the thin client aggregation server 11' the state change, device ID, device location, station ID, and tower ID. This thin client plug-in process may be active whenever the user mobile device 7' is on, or only be activated through an internet radio (or other streaming media) application.

More specifically, in step 1 the thin client plug-in 6' is activated. In step 2, the thin client plug-in 6' retrieves the device ID 23. The thin client plug-in 6' then checks for encrypted multicast 17. If no encrypted multicast 17 is received, then the thin client plug-in 6' continues to check for encrypted multicast 17 (see step 3). If, on the other hand, the thin client plug-in 6' finds an encrypted multicast 17, then the method proceeds to step 4, where the thin client plug-in 6' receives the tower ID, the multicast or channel ID, and the DRM key.

Moreover, as noted above, when moving between step 3 and step 4, a change of state occurs and the thin client plug-in 6' is now in a station "on" state. In step 5, the thin client plug-in 6' begins the decryption and provides streamed content to the media player function 22. In step 6, the thin client plug-in 6' retrieves the timestamp from the real-time clock 25 and GPS location 24. In step 7, the thin client plug-in 6' transmits a unicast packet U1, ... Un containing "state on" for the device ID, the tower ID, the timestamp, the GPS location, and the multicast or channel ID (see the broken line box labeled 15 in FIGS. 4 and 5). In step 8, the thin client plug-in 6' then checks for discontinuation of the encrypted multicast 17. If the encrypted multicast 17 has not discontinued, then the thin client plug-in 6' continues to check for such discontinuation of the encrypted multicast 17. On the other hand, if the thin client plug-in checks and finds that the encrypted multicast 17 has discontinued, then the method moves on to step 9. As noted above, when moving between step 8 and step 9, a change of state occurs and the thin client plug-in 6' is now in a station "off" state.

In the station "off" state, the thin client plug-in 6' then retrieves the timestamp from the real-time clock 25 and GPS location 24 as shown in step 9. In step 10, the thin client plug-in 6' transmits a unicast packet U1, . . . Un containing "state off" for the device ID, the tower ID, the timestamp, the GPS location, and the multicast or channel ID (see the broken line box labeled 15 in FIGS. 4 and 5). The thin client plug-in operation then returns to a point just prior to step 3 to again check for an encrypted multicast 17.

Figure 7:
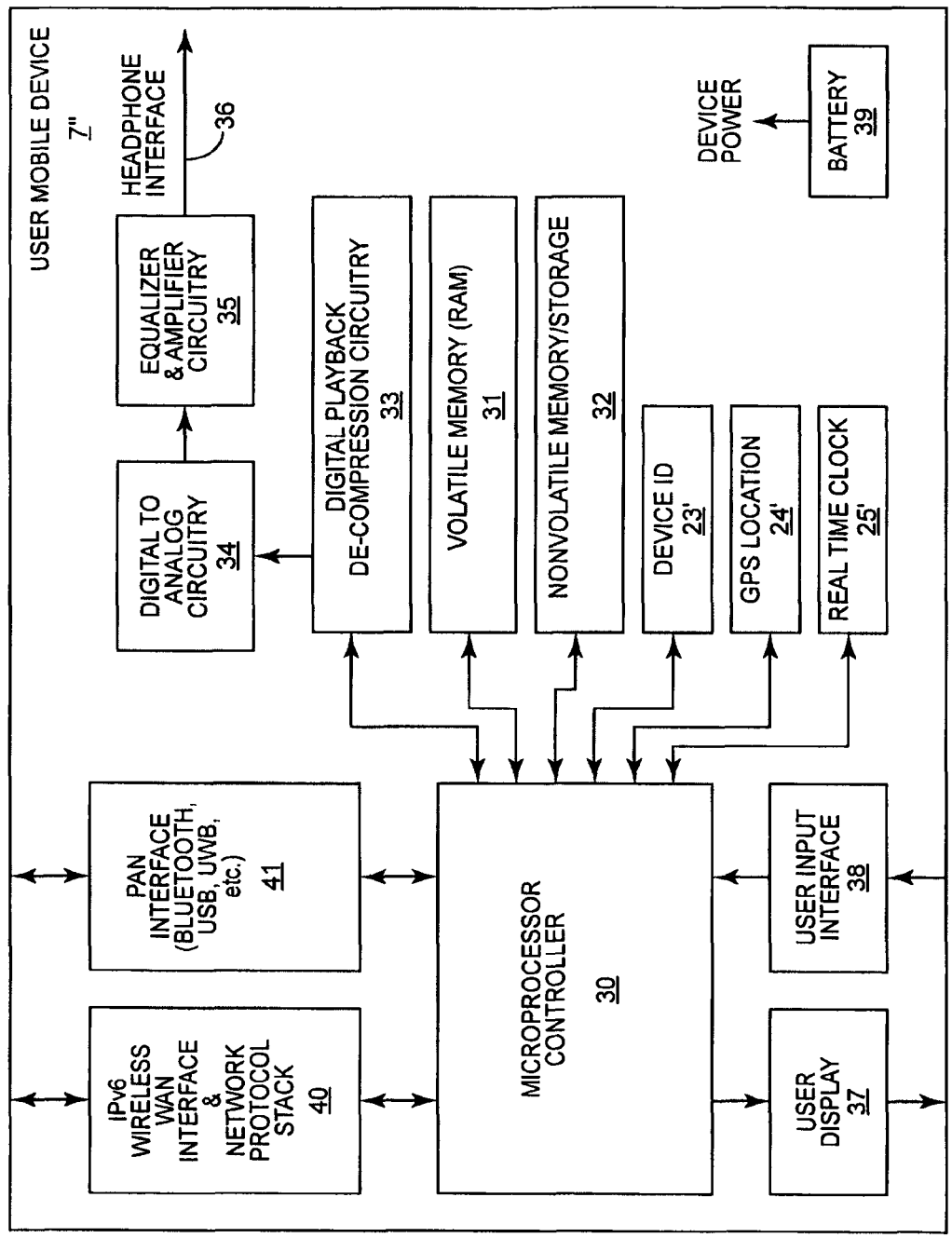
FIG. 7 illustrates an example of a platform for a mobile device for implementation of the present invention.

FIG. 7 illustrates an example of a platform for a user mobile device 7" for implementation of the present invention. The microprocessor 30 provides a controller for operation of the thin client plug-in. Volatile memory 31, such as random access memory (RAM) and non-volatile memory/storage 32 allow for temporary and long-term storage of associated applications and received content. Playback of the received internet radio station is supported by digital playback decompression circuitry 33, digital to analog conversion circuitry 34, equalizer and amplifier circuitry 35, a headphone interface 36, device ID 23', GPS receiver 24' and real time clock 25'. A user display 37, user interface 38 and battery 39 for device power would be typical of a smart phone or other mobile device with internet connectivity and content storage/playback functions. As the central entity, the microprocessor 30 provides interfaces to the Wide Area Network (WAN) 40, Local Area Network (LAN), and possibly Personal Area Network (PAN) 41. The WAN interface 40 allows for required on-line connections for receiving internet radio, and playback statistics reporting by the thin client.

EXAMPLE

Figure 8A:
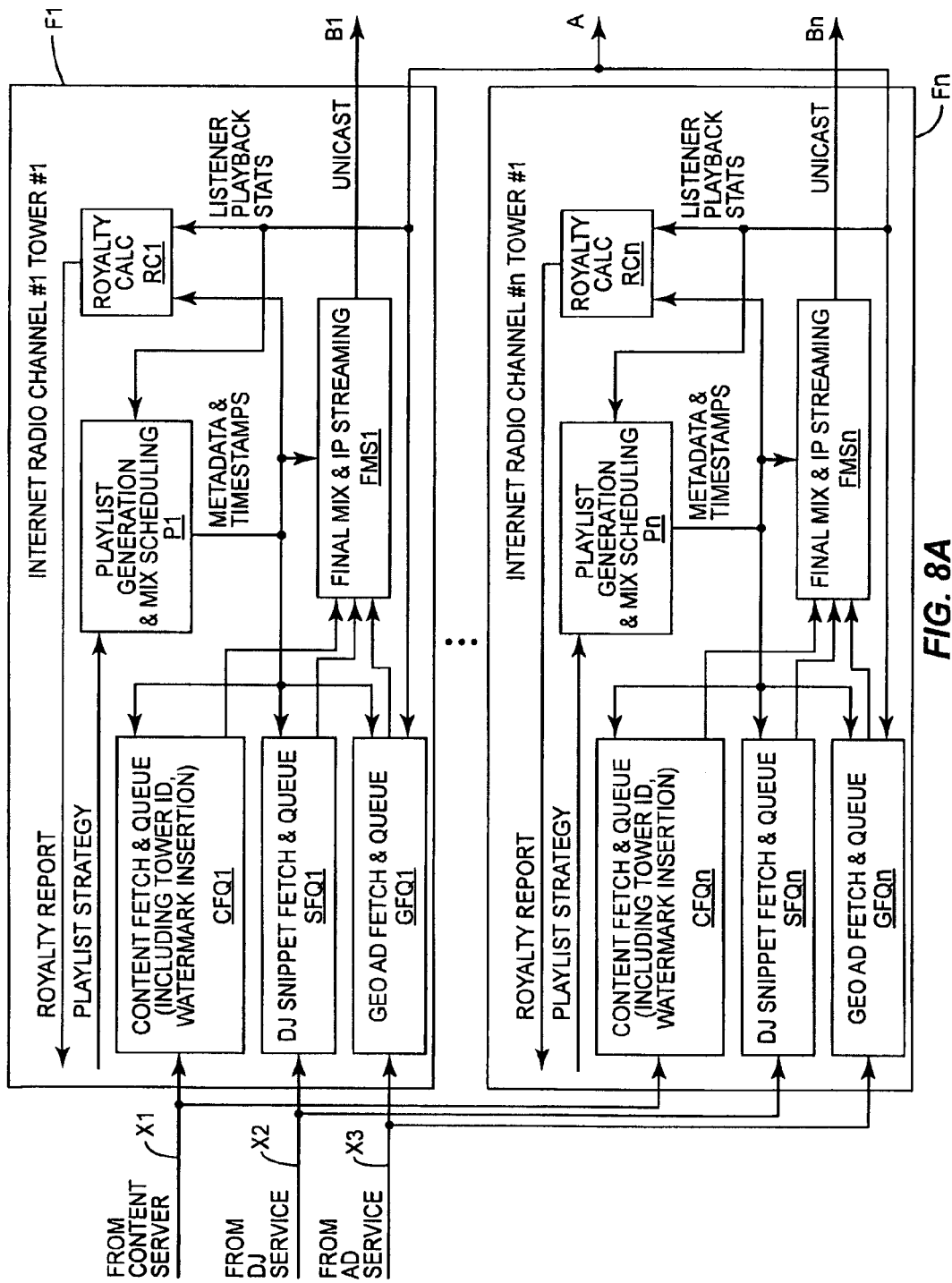
FIGS. 8A and 8B illustrate an example of a use-case ecosystem showing a scenario for implementation of the present invention.
Figure 8B:
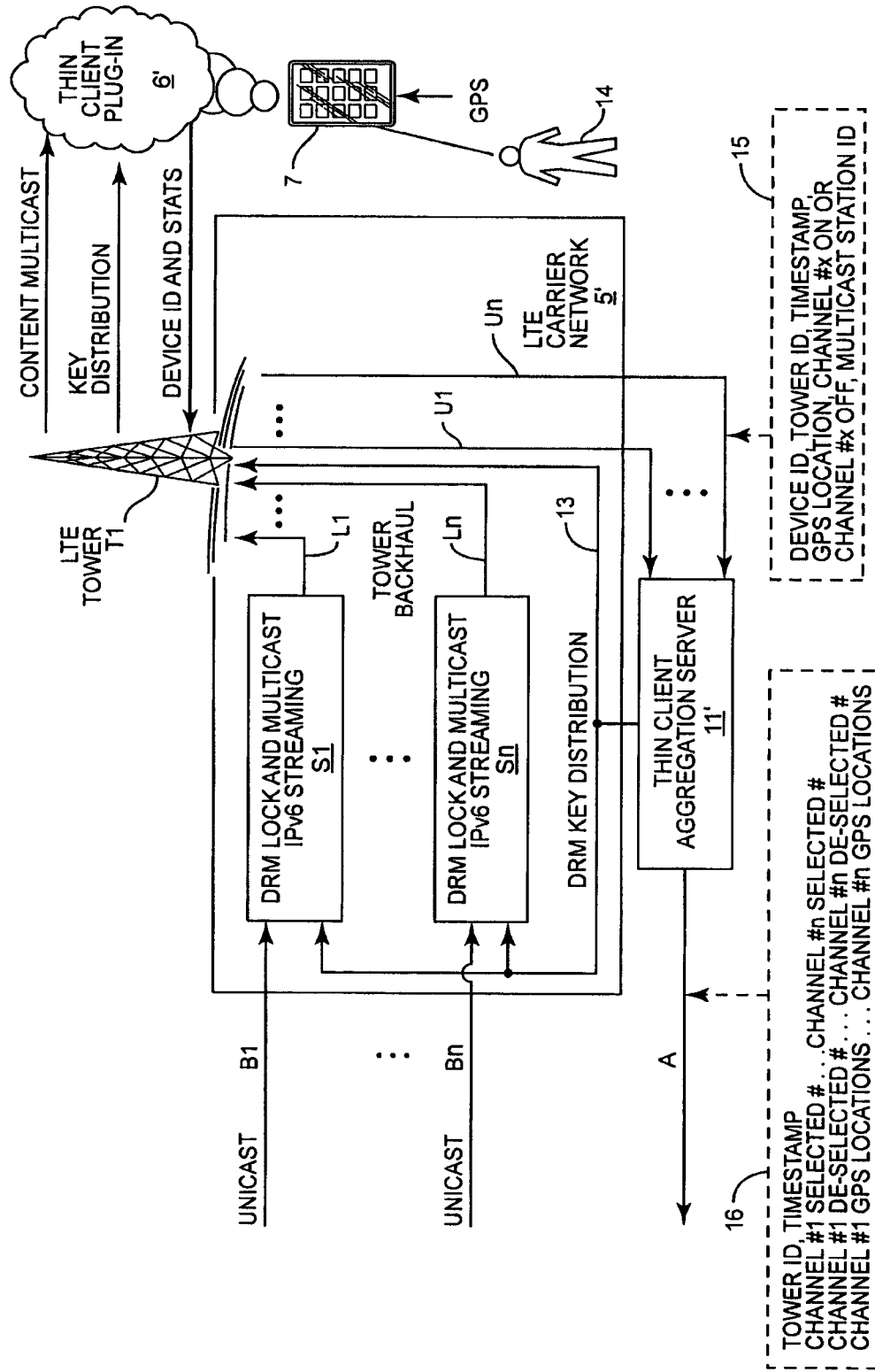

Use-Case Ecosystem Showing A Scenario For Implementation of the Present Invention With reference to FIGS. 8A and 8B, the following describes a exemplary scenario for implementation of the present invention utilizing ClearChannel and Verizon over an LTE network infrastructure:

1. As Verizon deploys LTE wireless technology through their network, they allocate in 10 Mbps (for each 100 Mbps of 20 MHz spectrum) for streaming multicast internet radio.

2. ClearChannel enters a business relationship with Verizon to use up to 2 Mbps of streaming bandwidth from each of Verizon's LTE tower access points in the real-time transport protocol (RTP) area for internet radio distribution as a customized simulcast option to their existing terrestrial radio broadcasts.

3. ClearChannel subdivides the leased 2 Mbps into 15 independent radio stations on each LTE tower access point streaming at 128 kbps per station. ClearChannel groups these 15 stations into 5 jazz, 5 country, and 5 rock formats. Example for the genres of the 5 rock formats could be (1) classic rock, (2) big-hair, (3) pop rock, (4) alternative, and (5) indie.

4. ClearChannel provides a per tower per station internet radio capability as shown in FIG. 8A. Key components and functionality include playlist generation/scheduling P1, . . . Pn, content fetch/queue CFQ1, . . . CFQn, DJ snippet fetch/queue SFQ1, . . . SFQn, geographic based ad fetch/queue GFQ1, . . . GFQn, final mixing/internet protocol (IP) streaming FMS1, . . . FMSn, and royalty calculation RC1, . . . RCn. Centralized or distributed servers X1, X2 and X3 house this shared content for music, disc jockey (DJ) snippets or segments and ads, respectively.

5. Each radio channel receives a playlist strategy (i.e., classic rock, etc.) from which a playlist and time-of-play scheduling is generated. As an alternate embodiment, a single playlist may be generated for each station type for common station use with each LTE tower (i.e., all LTE towers would have the same classic rock playlist and time of play schedule. This scenario allows listeners to seamlessly transition between LTE towers while listening to a song on a given station. Metadata and timestamps are used by each of the fetch functions to retrieve music, DJ, and ad content just prior to final mixing and streaming towards the Verizon LTE backhaul network. Even though a single playlist is used between towers, the DJ and ad content would be different. (i.e., Clients may be required to have a buffering function to keep skips from happening during tower T1 transition while DJ snippets or ads are being played.)

6. As Verizon receives each stream radio station B1, . . . Bn for each tower T1, . . . Tn, the content is encrypted as previously described for FIG. 4 (and shown again in FIG. 8B). After encryption, the content is re-streamed via multicast functionality of the LTE carrier network. In addition to the encrypted content, the DRM key is routinely sent with the multicast. Each radio station may have its own unique multicast (i.e., multicast address) or all stations (or groups of stations) may be within a single multicast with sub-channel identifiers on a per station basis.

7. Each Verizon customer (user 14) that wishes to listen to internet radio on the LTE network must download (or have installed) the thin client plug-in 6' as described in FIG. 5. The encryption is matched to only operate with this plug-in when the key is provided. Since the radio stations are ad supplemented, the plug-ins are provided at no or minimal charge and all plug-ins are identical (at least in functionality). Plug-ins may have to be customized on a per type of handset basis, but not on a per user basis (i.e., Hardware/firmware specifics of a Nokia handset may require a different plug-in than a Motorola handset).

8. As a given Verizon customer selects internet radio, the steps of FIG. 6 execute to produce the unicast responses U1, . . . Un back to the thin client aggregation server 11' described in FIG. 4. In summary, the thin client aggregation server 11' will receive an indication and GPS location from the thin client plug-in 6' whenever a listener tunes to or from one of the 15 ClearChannel internet radio stations. Alternately, for long listening sessions, the thin client may send location updates, even if the station has not changed (not shown in FIG. 4).

9. The thin client aggregation server 11' summaries these received statistics for each radio station and returns the data as shown by feedback A to the radio station function for royalty calculations and listener locations/densities for identifying appropriate ads. These statistics may be continuously transmitted back to the radio station or provided on a per request basis (i.e., the station may request the number of listeners between two timestamps for calculating royalty fees on a given song). For ad selection, the station may also request a specific number of listeners within a certain geographic defined region at a certain time. For example, a given vendor may have a rule set such that if more than 20 listeners are within a one mile radius of their restaurant, they will pay to fill an ad slot. Specific shapes may be used in the rule determination as described in U.S. application Ser. No. 12/189,861 entitled "Method for Location Based Advertising Based on Binding Bids to User Defined Arbitrary Shapes". In this particular embodiment, the aggregation server 11' would aggregate the unicast responses U1, . . . Un based upon a custom defined geographic shape by each radio station. The information fed back to the radio station would also include the identification of the custom defined geographic shape.

10. In addition to providing feedback as at A to the radio station, Verizon's aggregation server 11' may give direct feedback to vendors. For example, the restaurant vendor may receive notification short message service (SMS) text or other means when their ad is played and the number of listeners within the radius at ad play. The vendor may then light up an electronic billboard in front of the restaurant welcoming listeners of the specific ClearChannel classic rock radio station. Alternatively, an inspiring young entrepreneur may subscribe to receive notification of all ads and numbers of listeners from all of ClearChannel's radio stations at a given geographic location. The entrepreneur has an arrangement with one or more vendors to twirl signs on a street corner when their ads play one or more of the radio stations.

From the above-described use case Example, assuming a 10% bandwidth reservation for internet radio by wireless carriers and a potential 2% royalty, this would potentially yield a $2M license opportunity for each $1B of wireless data revenue for a given carrier.

Additionally, the collection and usage of the aggregated statistics on a per tower basis and the ability to stream unique playlists and localized vendor ads to the tower may also generate licensing opportunities directly to large radio station owners.

The present invention has substantial opportunity for variation without departing from the spirit or scope of the present invention. For example, while the embodiments discussed herein are directed to a common secure client, the present invention is not limited thereto. A more secure scenario could use unique-to-device clients for secure decryption thereby leveraging the satellite radio protection scheme. However, per device overhead and maintenance would be much higher that with a common secure client. Moreover, instead of GPS location determination; tower triangulation or an alternate localized position system could be used.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method comprising:
   receiving a plurality of real time media content streams from one or more streaming media sources;
   encrypting the plurality of real time media content streams to provide a corresponding plurality of encrypted real time media content streams;
   multicasting the plurality of encrypted real time media content streams via a wireless network;
   receiving unicast responses from a plurality of user devices in response to the multicasting of the plurality of encrypted real time media content streams, wherein at least one unicast response of the unicast responses includes information indicative of a connect multicast state or a disconnect multicast state of a corresponding one of the plurality of user devices; and
   returning information indicative of the unicast responses from the plurality of user devices to the one or more streaming media sources in such a manner as to preserve privacy of users of the plurality of user devices.

2. The method of claim 1 wherein the information returned to the one or more streaming media sources does not include device IDs of the plurality of user devices.

3. The method of claim 1 wherein the information returned to the one or more streaming media sources comprises, for each user device of the plurality of user devices, information that identifies one of the plurality of encrypted real time media content streams to which the user device has connected or information that identifies one of the plurality of encrypted real time media content streams from which the user device has disconnected.

4. The method of claim 3 wherein the information returned to the one or more streaming media sources further comprises, for each user device of the plurality of user devices, one or more of a group consisting of: a location of the user device, a tower ID, and a timestamp.

5. A server computer enabling per access-point streaming media customization and privacy protected feedback in a wireless network comprising:
   a backhaul entry adapted to:
      encrypt real time streamed media content from a streaming media source; and
      multicast the streamed encrypted media content for availability to a plurality of user devices; and
   an aggregation service adapted to:
      receive unicast responses from the plurality of user devices in the form of a connect multicast state or a disconnect multicast state of the plurality of user devices based on the plurality of user devices joining or dropping the multicast of the streamed encrypted media content;
      aggregate the unicast responses to provide aggregate information; and
      provide the aggregate information to the streaming media source.

6. The server computer of claim 5, wherein the streaming media source is an Internet radio source.

7. The server computer of claim 5, wherein at least some of the plurality of user devices are mobile devices.

8. The server computer of claim 7, wherein each of the unicast responses from each of the mobile devices further includes at least one of a unique mobile device identification (ID) or a location coordinate of the mobile device.

9. The server computer of claim 7, wherein each of the unicast responses from each of the mobile devices further includes a unique mobile device identification (ID), a location coordinate of the mobile device, a streaming media source ID request, and a timestamp.

10. The server computer of claim 7, wherein each of the mobile devices is one of a smart phone or a portable media device.

11. The server computer of claim 5, wherein the wireless network comprises a bandwidth constrained wide area network (WAN) connected IPv6 mobile network.

12. A method of per access-point streaming media customization and privacy protected feedback in a wireless network, the method comprising:
   encrypting real time streamed media content from a streaming media source;
   multicasting the streamed encrypted media content for availability to a user device for playback;
   receiving, from the user device, unicast responses at the time of joining or dropping the multicast;
   aggregating the unicast responses in the form of a connect multicast state or a disconnect multicast state of the user device based on the joining or dropping of the multicast; and
   providing information back to the streaming media source based on the aggregated unicast responses.

13. The method of claim 12, wherein the streaming media source is an Internet radio.

14. The method of claim 13, wherein the information provided back to the Internet radio as the streaming media source includes at least one of a radio tower identification (ID), a timestamp, a channel selected, a channel de-selected, or a channel global positioning system (GPS) location.

15. The method of claim 12, wherein the user device comprises a mobile device.

16. The method of claim 15, wherein each of the unicast responses from the mobile device further includes at least one of a unique mobile device identification (ID) or a location coordinate of the mobile device.

17. The method of claim 16, wherein the location coordinate is determined via a global positioning system (GPS).

18. The method of claim 15, wherein each of the unicast responses from the mobile device further includes a unique mobile device identification (ID), a location coordinate of the mobile device, a streaming media source ID request, and a timestamp.

19. The method of claim 15, wherein the mobile device is one of a smart phone or a portable media device.

20. The method of claim 12, wherein the wireless network comprises a bandwidth constrained wide area network (WAN) connected IPv6 mobile network.

21. The method of claim 12, wherein the streamed encrypted media content is encrypted with a digital rights management (DRM) key.

22. A server computer enabling per access-point streaming media customization and privacy protected feedback in a wireless network comprising:
   a backhaul entry adapted to multicast streamed media content from a streaming media source for availability to a plurality of user devices; and
   an aggregation service adapted to:
      receive unicast responses from the plurality of user devices in the form of a connect multicast state or a disconnect multicast state of the plurality of user devices based on the plurality of user devices joining or dropping the multicast of the streamed encrypted media content;
      aggregate the unicast responses to provide aggregate information; and
      provide the aggregate information to the streaming media source.

23. The server computer of claim 22, wherein the streaming media source is an Internet radio source.

24. The server computer of claim 22, wherein at least some of the plurality of user devices are mobile devices.

25. The server computer of claim 24, wherein each of the unicast responses from each of the mobile devices further includes at least one of a unique mobile device identification (ID) or a location coordinate of the mobile device.

26. The server computer of claim 24, wherein each of the unicast responses from each of the mobile devices further includes a unique mobile device identification (ID), a location coordinate of the mobile device, a streaming media source ID request, and a timestamp.

27. The server computer of claim 24, wherein each of the mobile devices is one of a smart phone or a portable media device.

28. The server computer of claim 22, wherein the wireless network comprises a bandwidth constrained wide area network (WAN) connected IPv6 mobile network.

29. A method of per access-point streaming media customization and privacy protected feedback in a wireless network, the method comprising:
   multicasting streamed media content from a streaming media source for availability to a user device for playback;
   receiving, from the user device, unicast responses at the time of joining or dropping the multicast;
   aggregating the unicast responses in the form of a connect multicast state or a disconnect multicast state of the user device based on the joining or dropping of the multicast; and
   providing information back to the streaming media source based on the aggregated unicast responses.

30. The method of claim 29, wherein the streaming media source is an Internet radio.

31. The method of claim 30, wherein the information provided back to the Internet radio as the streaming media source includes at least one of a radio tower identification (ID), a timestamp, a channel selected, a channel de-selected, or a channel global positioning system (GPS) location.

32. The method of claim 29, wherein the user device comprises a mobile device.

33. The method of claim 32, wherein the mobile device is one of a smart phone or a portable media device.

34. The method of claim 32, wherein each of the unicast responses from the mobile device further includes at least one of a unique mobile device identification (ID) or a location coordinate of the mobile device.

35. The method of claim 34, wherein the location coordinate is determined via a global positioning system (GPS).

36. The method of claim 32, wherein each of the unicast responses from the mobile device further includes a unique mobile device identification (ID), a location coordinate of the mobile device, a streaming media source ID request, and a timestamp.

37. The method of claim 29, wherein the wireless network comprises a bandwidth constrained wide area network (WAN) connected IPv6 mobile network.

38. The method of claim 29, wherein the streamed encrypted media content is encrypted with a digital rights management (DRM) key.

39. A non-transitory computer readable medium comprising software for instructing a mobile device to:
   connect or disconnect via a network interface to a multicast encrypted media stream;
   for each state change of one or more state changes, store a timestamp for the state change, where each state change is one of a group consisting of: connecting to the multicast encrypted media stream or disconnecting from the multicast encrypted media stream;
   receive via the network interface an identification associated with the multicast encrypted media stream; and
   for each state change of the one or more state changes, transmit a response via the network interface, wherein the response comprises a unique ID associated with the mobile device, the identification associated with the multicast encrypted media stream, the state change of connecting or disconnecting, and the timestamp associated with the state change.

40. The non-transitory computer readable medium of claim 39 wherein the software further instructs a mobile device to:
   receive a key via the network interface for decryption of the multicast encrypted media stream; and
   decrypt and provide contents of the media stream to a playback function associated with the mobile device.

41. The non-transitory computer readable medium of claim 39 wherein the response is transmitted to an aggregation server.

42. The non-transitory computer readable medium of claim 39 wherein the network interface is a wireless interface.

43. The non-transitory computer readable medium of claim 42 wherein the wireless interface connects the mobile device to a Long Term Evolution (LTE) network.

44. The non-transitory computer readable medium of claim 42 wherein the wireless interface connects the mobile device to a WiMAX network.

45. The non-transitory computer readable medium of claim 42 wherein the mobile device is one of a group consisting of: a cellular phone and a smartphone.

46. The non-transitory computer readable medium of claim 42 wherein a location associated with the timestamp is stored and included in the response.

47. The non-transitory computer readable medium of claim 42 wherein the network interface is IPv6 enabled.

48. A method of operation of a server computer to provide one or more real-time media streams to a plurality of mobile devices via a backhaul entry point of an access device in a wireless network, comprising:
receiving one or more real-time media streams;
receiving one or more keys for encryption of the one or more real-time media streams;
encrypting the one or more real-time media streams as a function of the one or more keys to provide one or more encrypted media streams; and
transmitting, using multicast, the one or more encrypted media streams for availability to the plurality of access devices via the backhaul entry point.

49. The method of claim 48 wherein transmitting the one or more encrypted media streams comprises transmitting the one or more keys with the encrypted media streams.

50. The method of claim 48 wherein the one or more keys are unique for the access device.

51. The method of claim 48 wherein the access device is at least a portion of a tower site in the wireless network.

52. The method of claim 48 wherein the wireless network is a Long Term Evolution (LTE) network.

53. The method of claim 48 wherein the wireless network is a WiMAX network.

54. The method of claim 48 wherein receiving the one or more keys comprises receiving the one or more keys from an aggregation server that operates to aggregate unicast responses from the plurality of mobile devices related to the one or more encrypted media streams.

55. A method of operation of a server computer, comprising:
transmitting a key for decryption of an encrypted multicast media stream for availability to a plurality of mobile devices via a wireless network;
receive a plurality of responses from the plurality of mobile devices, wherein each response of the plurality of responses comprises: a unique ID associated with a corresponding mobile device of the plurality of mobile devices, an identification associated with the encrypted multicast media stream, a state change of the corresponding mobile device wherein the state change is one of joining or dropping a connection to the encrypted multicast media stream, and a timestamp associated with the state change; and
aggregating the plurality of responses such that privacy of the plurality of mobile devices is maintained.

56. The method of claim 55 wherein aggregating the plurality of responses comprises aggregating the plurality of responses in such a manner as to exclude the unique IDs of the plurality of mobile devices.

57. The method of claim 55 wherein aggregating the plurality of responses is in a manner for royalty calculations.

58. The method of claim 55 wherein each response further comprises an access-point identification.

59. The method of claim 55 wherein the wireless network is a Long Term Evolution (LTE) network.

60. The method of claim 55 wherein the wireless network is a WiMAX network.

61. The method of claim 55 wherein each response further comprises a location of the corresponding mobile device at a time indicated by the timestamp.

62. The method of claim 55 wherein transmitting the key comprises transmitting the key to a multicast server.

63. The method of claim 55 wherein transmitting the key comprises transmitting the key to the plurality of mobile devices.

64. The method of claim 55 wherein transmitting the key comprises transmitting the key such that the key passes through a multicast server and is provided to the plurality of mobile devices in association with the encrypted multicast media stream.

* * * * *